United States Patent
Ahn et al.

(10) Patent No.: US 8,602,618 B2
(45) Date of Patent: Dec. 10, 2013

(54) INTELLIGENT HEAD LAMP ASSEMBLY FOR VEHICLE

(75) Inventors: Byoung Suk Ahn, Suwon-si (KR); Hoo Taek Cho, Yongin-si (KR); Young Sub Oh, Suwon-si (KR); Jong Ryoul Park, Gyeongsan-si (KR); Myong Guan Jeong, Gyeongsan-si (KR)

(73) Assignee: Hyundai Motor Company, Seoul (KR)

( * ) Notice: Subject to any disclaimer, the term of this patent is extended or adjusted under 35 U.S.C. 154(b) by 212 days.

(21) Appl. No.: 13/172,436

(22) Filed: Jun. 29, 2011

(65) Prior Publication Data
US 2012/0127747 A1 May 24, 2012

(30) Foreign Application Priority Data
Nov. 19, 2010 (KR) .................. 10-2010-0115404

(51) Int. Cl.
*B60Q 1/08* (2006.01)
*F21V 14/04* (2006.01)

(52) U.S. Cl.
USPC .......................................... 362/538; 362/465

(58) Field of Classification Search
USPC .................. 362/464–468, 538, 539
See application file for complete search history.

(56) References Cited

U.S. PATENT DOCUMENTS

| | | | | |
|---|---|---|---|---|
| 6,023,365 A | * | 2/2000 | McDonald | 359/291 |
| 6,497,503 B1 | * | 12/2002 | Dassanayake et al. | 362/465 |
| 6,969,183 B2 | * | 11/2005 | Okubo et al. | 362/466 |
| 6,993,255 B2 | * | 1/2006 | Braun et al. | 396/61 |
| 7,054,730 B2 | * | 5/2006 | Izawa et al. | 701/49 |
| 7,175,323 B2 | * | 2/2007 | Bucher | 362/539 |
| 8,033,697 B2 | * | 10/2011 | Fang et al. | 362/466 |
| 2012/0113664 A1 | * | 5/2012 | Park et al. | 362/516 |

FOREIGN PATENT DOCUMENTS

| | | |
|---|---|---|
| JP | 2005228715 A | 8/2005 |
| JP | 2006-040707 A | 2/2006 |
| JP | 2007080605 A | 3/2007 |
| JP | 2009-259667 A | 11/2009 |
| KR | 100509581 B1 | 8/2005 |
| KR | 100513876 B1 | 9/2005 |
| KR | 20100095811 A | 9/2010 |

* cited by examiner

*Primary Examiner* — Alan Cariaso
(74) *Attorney, Agent, or Firm* — Morgan, Lewis & Bockius LLP

(57) ABSTRACT

An intelligent head lamp assembly for a vehicle may include a light source to irradiate light, a reflector reflecting the light irradiated from the light source, a beam pattern variable unit having at least a digital micro-mirror device (DMD) that selectively change direction of the light reflected by the reflector to a predetermined angle, and a projection lens optical system irradiating the light selectively reflected by the beam pattern variable unit onto a road surface.

7 Claims, 6 Drawing Sheets

INTELLIGENT HEAD LAMP ASSEMBLY FOR VEHICLE

CROSS-REFERENCE TO RELATED APPLICATION

The present application claims priority to Korean Patent Application No. 10-2010-0115404, filed on Nov. 19, 2010 in the Korean Intellectual Property Office, the entire contents of which is incorporated herein for all purposes by this reference.

BACKGROUND OF THE INVENTION

1. Field of the invention

The present invention relates to an intelligent head lamp assembly for a vehicle, and more particularly, to an intelligent headlight system which provides an optimum illumination state in front of the vehicle by displaying diverse beam patterns and vehicle driving information on a front road in accordance with the change of various driving situations (driving state, environmental condition, and the like) during the nighttime driving.

2. Description of Related Art

In general, a vehicle is a device which enables a driver to confirm road conditions and obstacles by providing visual information to the driver through illumination in a front direction of the vehicle during the nighttime driving, and gives signals to other road users.

Vehicle head lamps, which are also called vehicle headlights, are illumination lamps that emit light in the front direction of the vehicle in which the vehicle travels. Although the head lamps require brightness enough to secure the front visual field at night and to confirm obstacles on the road, the laws for preventing oncoming vehicle, lead vehicles, and pedestrians from feeling dazzling or inconvenience have been established.

In order to satisfy the above-described laws, a head lamp universally adopts a shield to form a cutoff line. In the case of an intelligent head lamp in the related art, in order to make automatically changing beams possible to implement one or more additional modes with respect to the change of the traveling conditions (road, weather, vehicle traveling state, and the like) during the nighttime driving, dynamic beam patterns are implemented by implementing the cutoff of the beams using a shield, a shield actuator for driving the shield, and a swivel actuator.

However, the intelligent head lamp in the related art has the problem that it has a structure that uses the shield, the shield actuator, the swivel actuator, and the like, to automatically implement desired beam patterns, and thus its structure is heavy and complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an intelligent head lamp assembly for a vehicle, which can not only reduce the weight but also simplify the structure only through an application of a beam pattern variable type reflective surface to a head lamp without using a shield or an actuator having a complicated structure in implementing the beam cutoff and diverse beam patterns.

In one aspect of the present invention, there is provided an intelligent head lamp assembly for a vehicle, including a light source to irradiate light, a reflector reflecting the light irradiated from the light source, a beam pattern variable unit having at least a digital micro-mirror device (DMD) that selectively change direction of the light reflected by the reflector to a predetermined angle, and a projection lens optical system irradiating the light selectively reflected by the beam pattern variable unit onto a road surface.

The beam pattern variable unit may further include a driving unit engaged to the at least a digital micro-mirror device to change orientation of the at least a digital micro-mirror device at a predetermined angle around a predetermined axis respectively in accordance with vehicle information, wherein the vehicle information may include a fuel state or a turn signal.

When an electric signal may be activated to the driving unit, the driving unit drives the at least a digital micro-mirror device to make the light reflected by the reflector incident to the projection lens optical system, and when another electric signal may be activated to the driving unit, the driving unit drives at least digital micro-mirror device to prevent the light reflected by the reflector from being incident to the projection lens optical system.

The intelligent head lamp assembly may further may include a prism installed between the reflector and the beam pattern variable unit to reflect the light reflected by the reflector to the at least a digital micro-mirror device.

The intelligent head lamp assembly may further include an infrared ray and ultraviolet ray filter installed between the light source and the prism.

The prism may have a prism surface that reflects the light reflected by the reflector to the at least digital micro-mirror device.

The prism may include a first prism surface that reflects the light reflected by the reflector to at least digital micro-mirror device, a second prism surface that reflects again the light which may be reflected by the first prism surface, and a third prism surface that reflects again the light reflected by the second prism surface in a front direction of the vehicle such that the light may be not incident to the projection lens optical system.

The intelligent head lamp assembly may further include a reflective member provided around the projection lens optical system to irradiate the light reflected by the third prism surface in a direction of the vehicle.

According to the intelligent head lamp assembly according to the present invention as described above, by replacing the components having a complicated structure including the shield, the shield actuator, and the swivel actuator in the related art by the beam pattern variable unit composed of an integrated body of digital micro-mirror devices, diverse beam patterns and vehicle driving information can be displayed on a front road surface in accordance with the change of the traveling conditions (road, weather, vehicle traveling state, and the like) during the nighttime driving.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
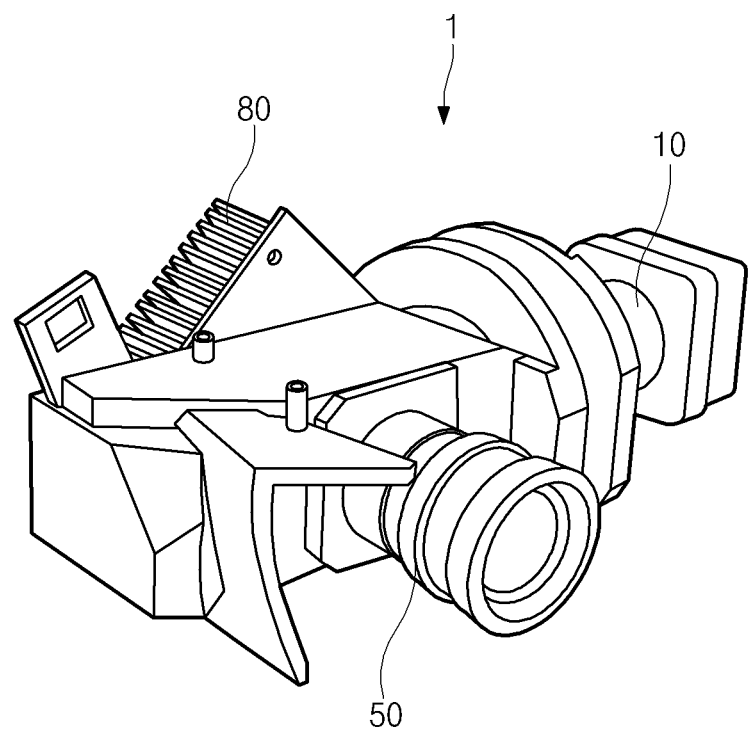
FIG. 1 is a perspective view illustrating an intelligent head lamp assembly for a vehicle according to various exemplary embodiments of the invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
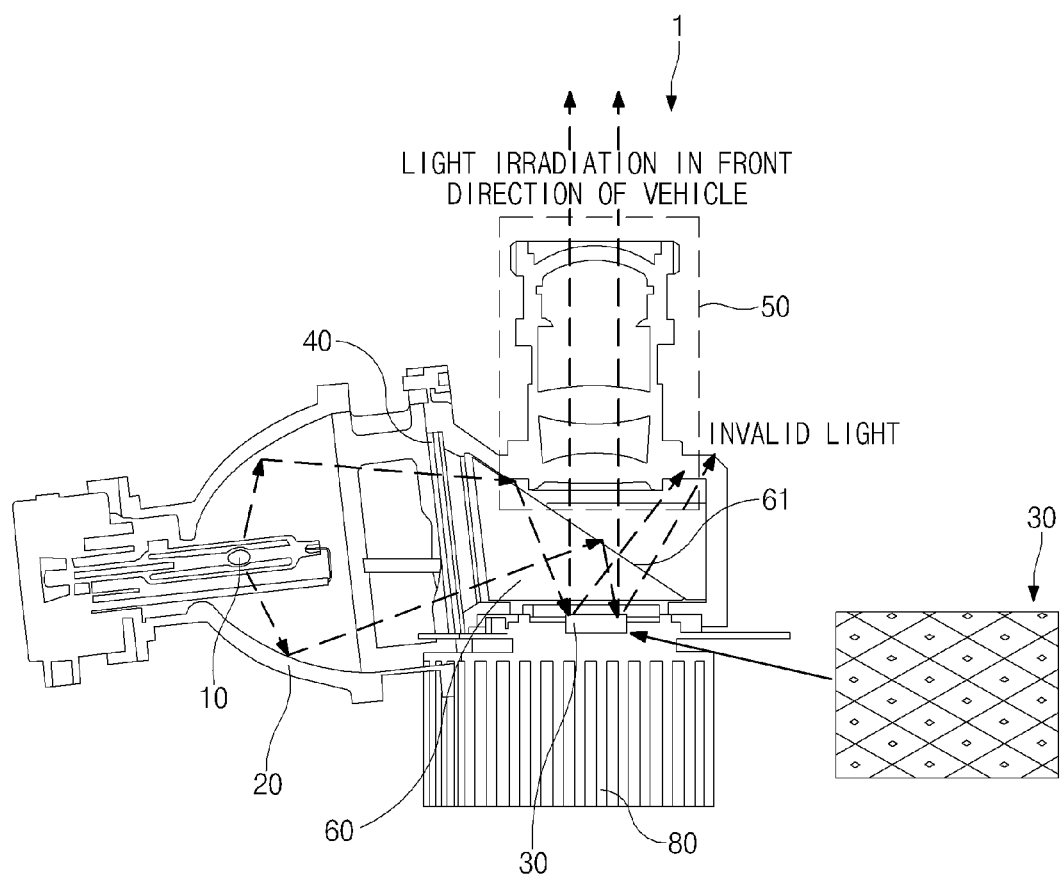
FIG. 2 is a cross-sectional view illustrating a light path of FIG. 1.

An intelligent head lamp assembly 1 for a vehicle according to the first embodiment of the invention, as illustrated in FIGS. 1 and 2, includes a light source 10 irradiating light, a reflector 20, a beam pattern variable unit 30, a projection lens optical system 50, and a heat dissipation plate 80.

The reflector 20 has a shape that surrounds the circumference of the light source 10 to support the light source 10, and reflects light irradiated from the light source 10.

In front of the reflector 20, an IR (Infrared Ray) and UV (Ultraviolet Ray) filter 40 is mounted, and in front of the UR and UV filter 40, a prism 60 is mounted.

The prism 60 has one prism surface 61 for reflecting the light reflected by the reflector 20 onto the beam pattern variable unit 30. In this case, the prism surface 61 is formed to be inclined rearward, and reflects the light onto the beam pattern variable unit 30 that is arranged in the rear of the prism surface 61.

The beam pattern variable unit 30 is to display diverse beam patterns and vehicle information (symbols of a fuel state, a turn signal, an emergency signal, a vehicle speed, and the like) on a road surface by varying the beam patterns, and is a substitute for the components in the related art, such as the shield, the shield actuator, the swivel actuator, and the like.

Figure 3:
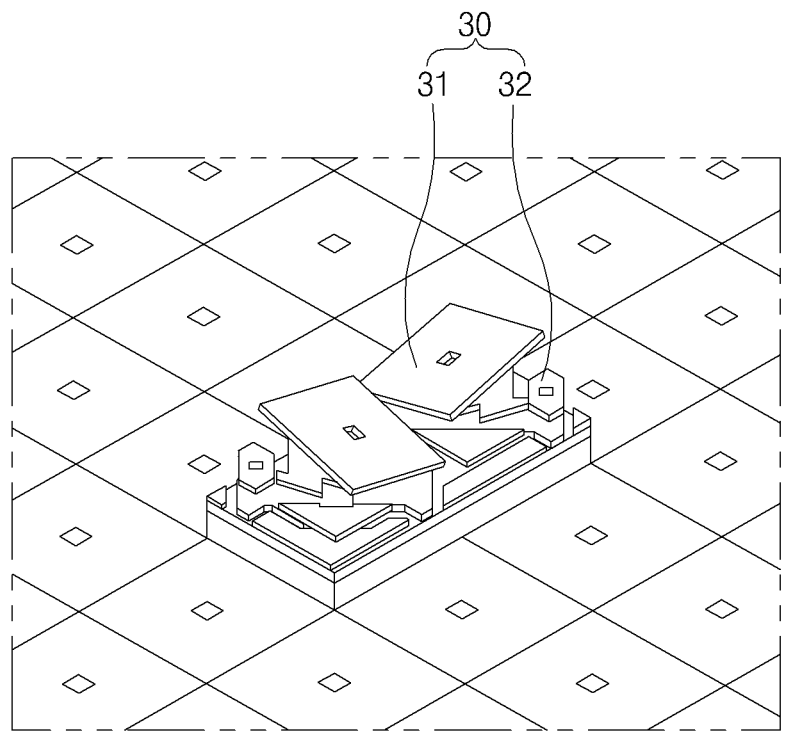
FIG. 3 is a perspective view illustrating a driving unit of a beam pattern variable unit of FIG. 1.
Figure 4:
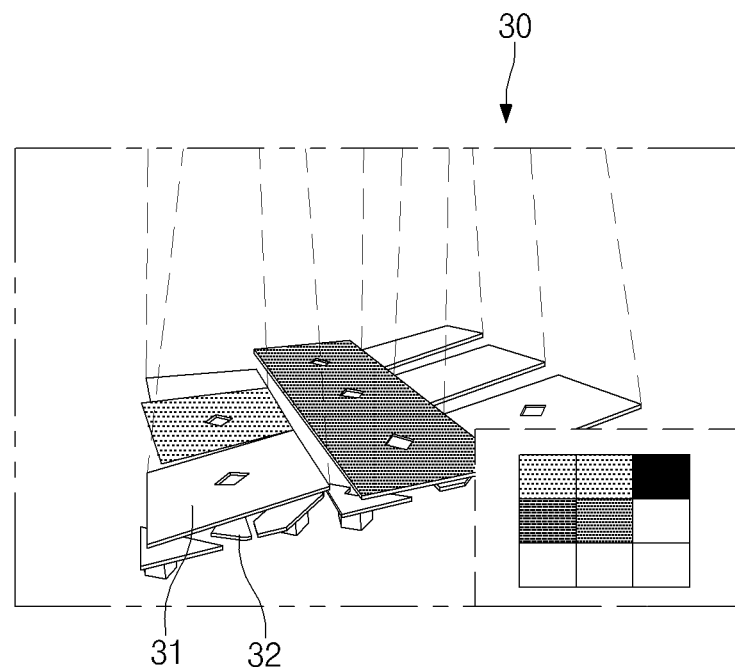
FIG. 4 is a perspective view illustrating beam patterns by a beam pattern variable unit of FIG. 3.

For this, the beam pattern variable unit 30, as illustrated in FIGS. 3 and 4, includes a plurality of digital micro-mirror devices DMD) 31 that change the light reflected by the prism 60 at a predetermined angle, and a driving unit 32 provided in lower portions of the plurality of digital micro-mirror devices 31 to change the digital micro-mirror devices 31 at the predetermined angle around a Z-axis in accordance with the vehicle information such as a fuel state or a turn signal.

That is, the beam pattern variable unit 30 is an integrated body of micro-mirror devices which are closely arranged at high density, and projects an image in accordance with the "on"/"off" state of an electric signal.

Figure 5:
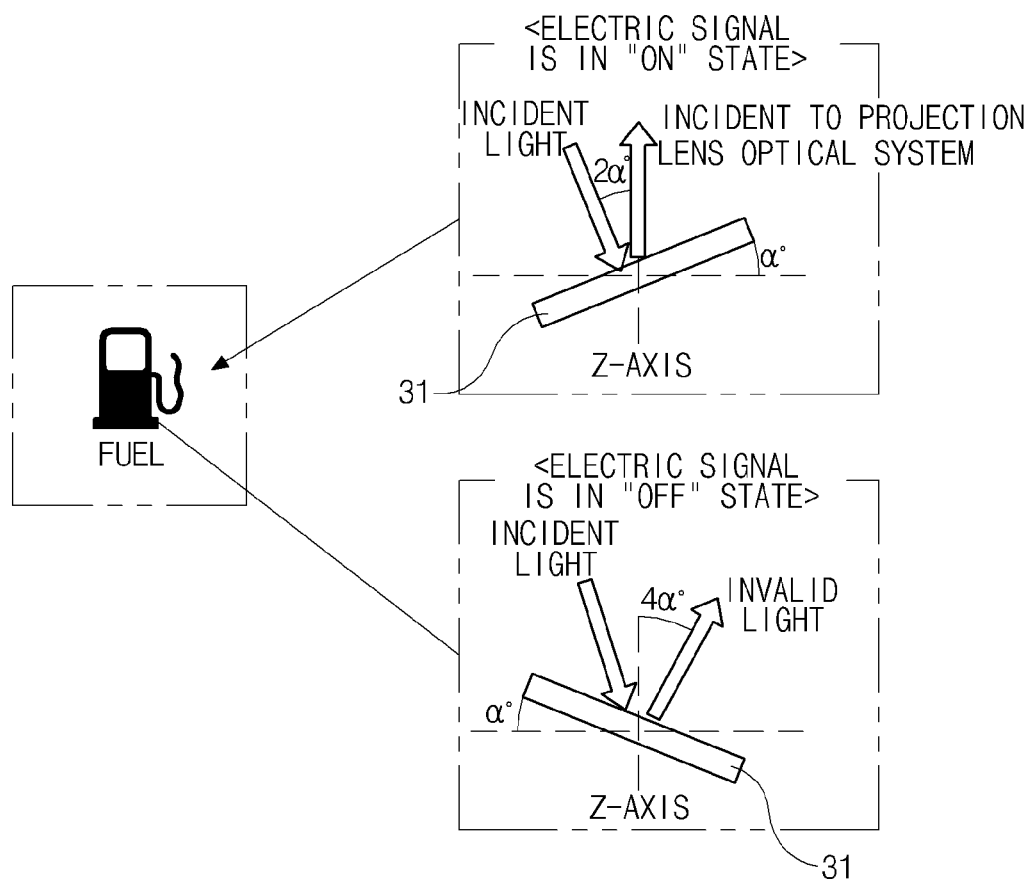
FIG. 5 is a diagram illustrating the state of digital micro-mirror devices when an electric signal is in an "on" state or in an "off" state IN FIG. 4.

In the case where the electric signal is in an "on" state, as illustrated in FIG. 5, the digital micro-mirror devices 31 are driven to be inclined upwardly at a° around the Z-axis, and the light, which is reflected by the prism 60 and is incident to the digital micro-mirror devices 31, is reflected by the digital micro-mirror devices 31 and is incident to the projection lens optical system 50. On the other hand, in the case where the electric signal is in an "off" state, the digital micro-mirror devices 31 are driven to be inclined downwardly at a° around the Z-axis, and the light, which is reflected by the prism 60 and is incident to the digital micro-mirror devices 31, is not incident to the projection lens optical system 50, and becomes an invalid light to make the light quantity zero.

That is, when the fuel state is displayed on the road surface as illustrated in FIG. 5, a black portion is displayed by the digital micro-mirror devices 31 in the case where the electric signal is in an "off" state, while a bright portion is displayed by the digital micro-mirror devices 31 in the case where the electric signal is in an "on" state.

The beam pattern variable unit 30 as described above has been developed by Texas Instruments, and the detailed description thereof will be omitted.

The projection lens optical system 50 is arranged in a horizontal direction of the prism 60, and includes a plurality of lenses to irradiate the light reflected by the beam pattern variable unit 30 forward.

The heat dissipation plate 80 is provided in the rear of the beam pattern variable unit 30, and serves to dissipate the heat generated by the light that is irradiated by the light source 10 to the outside.

Figure 6:
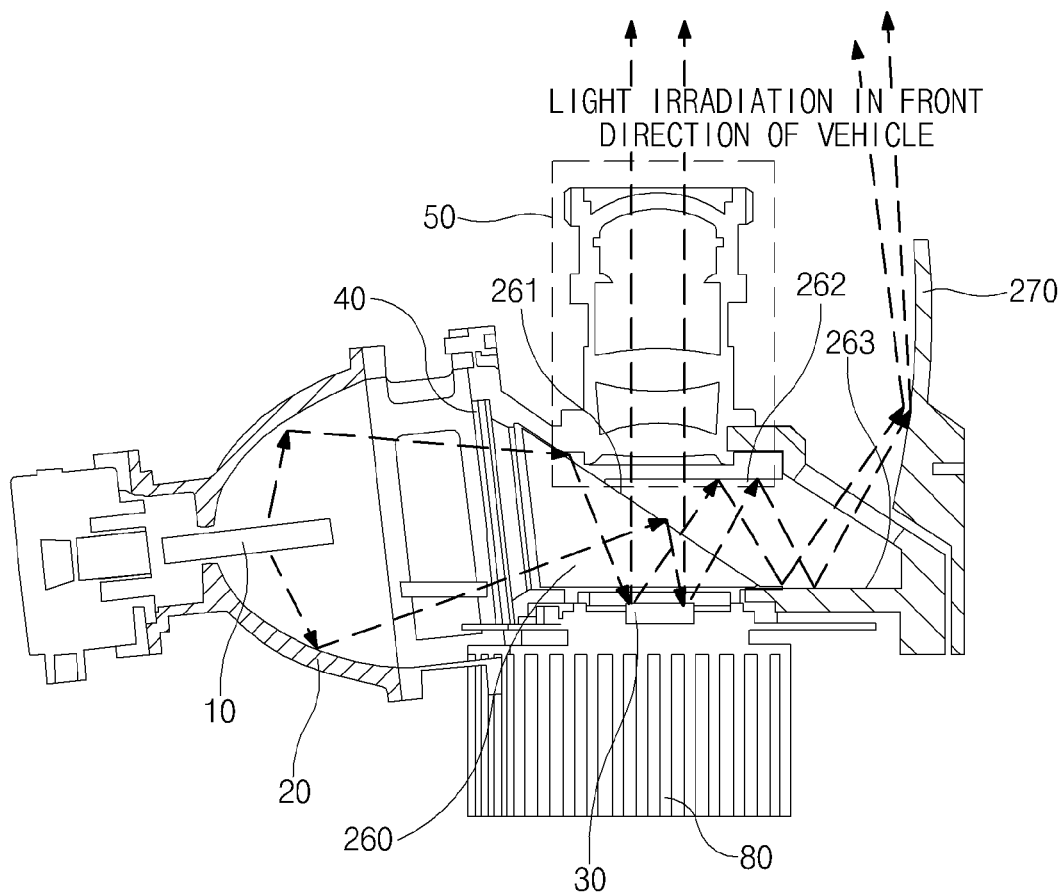
FIG. 6 is a cross-sectional view illustrating a light path of an intelligent head lamp assembly for a vehicle according to various exemplary embodiments of the invention.

FIG. 6 is a cross-sectional view illustrating a light path of an intelligent head lamp assembly for a vehicle according to a second embodiment of the invention.

The second embodiment of the invention is characterized in that the prism 60 according to the first embodiment is improved and a reflective member 270 is additionally provided, so that the invalid light that is reflected by the digital micro-mirror devices 31 when the electric signal is in an "off" state is reused to improve the light efficiency.

That is, a prism 260 according to the second embodiment of the invention has a first prism surface 261, a second prism surface 262, and a third prism surface 263.

The first prism surface 261 is formed to be inclined rearward in the same manner as the prism surface according to the first embodiment of the invention, and reflects the light to the digital micro-mirror devices 31 that is arranged in the rear of the first prism surface 261.

The second prism surface 262 reflects again the invalid light which is reflected by the first prism surface 261 and is not incident to the projection lens optical system 50 in the rear direction, and the third prism surface 263 reflects the light reflected again by the second prism surface 262 in the front direction of the vehicle.

In this case, it is preferable that a reflective member 270 is further provided around the projection lens optical system 50 to irradiate the light reflected by the third prism surface 263 in the front direction of the vehicle.

According to the intelligent head lamp assembly as constructed above according to an exemplary embodiment of the present invention, by replacing a large number of components such as the shield, the shield actuator, and the swivel actuator in the related art by the beam pattern variable unit 30 composed of an integrated body of digital micro-mirror devices 31, diverse beam patterns and vehicle driving information can be displayed on a front road surface in accordance with the change of the traveling conditions (road, weather, vehicle traveling state, and the like) during the nighttime driving, and thus the safety and convenience can be improved.

For convenience in explanation and accurate definition in the appended claims, the terms "upper", "lower", "inner", "outer", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intelligent head lamp assembly for a vehicle, comprising:
   a light source to irradiate light;
   a reflector reflecting the light irradiated from the light source;
   a beam pattern variable unit having at least a digital micro-mirror device (DMD) that selectively change direction of the light reflected by the reflector to a predetermined angle;
   a projection lens optical system irradiating the light selectively reflected by the beam pattern variable unit onto a road surface; and
   a prism installed between the reflector and the beam pattern variable unit to reflect the light reflected by the reflector to the at least a digital micro-mirror device;
   wherein the prism includes:
      a first prism surface that reflects the light reflected by the reflector to at least digital micro-mirror device;
      a second prism surface that reflects again the light which is reflected by the first prism surface; and
      a third prism surface that reflects again the light reflected by the second prism surface in a front direction of the vehicle such that the light is not incident to the projection lens optical system.

2. The intelligent head lamp assembly according to claim 1, wherein the beam pattern variable unit further includes a driving unit engaged to the at least a digital micro-mirror device to change orientation of the at least a digital micro-mirror device at a predetermined angle around a predetermined axis respectively in accordance with vehicle information.

3. The intelligent head lamp assembly according to claim 2, wherein the vehicle information includes a fuel state or a turn signal.

4. The intelligent head lamp assembly according to claim 2, wherein when an electric signal is activated to the driving unit, the driving unit drives the at least a digital micro-mirror device to make the light reflected by the reflector incident to the projection lens optical system, and when another electric signal is activated to the driving unit, the driving unit drives at least digital micro-mirror device to prevent the light reflected by the reflector from being incident to the projection lens optical system.

5. The intelligent head lamp assembly according to claim 1, further comprising an infrared ray and ultraviolet ray filter installed between the light source and the prism.

6. The intelligent head lamp assembly according to claim 1, wherein the prism has a prism surface that reflects the light reflected by the reflector to the at least digital micro-mirror device.

7. The intelligent head lamp assembly according to claim 1, further comprising a reflective member provided around the projection lens optical system to irradiate the light reflected by the third prism surface in a direction of the vehicle.

\* \* \* \* \*